United States Patent
Wilton

(10) Patent No.: US 10,152,499 B1
(45) Date of Patent: Dec. 11, 2018

(54) DATABASE REPLICATION SCALING

(71) Applicant: Amazon Technologies, Inc., Seattle, WA (US)

(72) Inventor: Jeremiah Wilton, Seattle, WA (US)

(73) Assignee: Amazon Technologies, Inc., Seattle, WA (US)

(\*) Notice: Subject to any disclaimer, the term of this patent is extended or adjusted under 35 U.S.C. 154(b) by 413 days.

(21) Appl. No.: 14/867,589

(22) Filed: Sep. 28, 2015

(51) Int. Cl.
*G06F 17/30* (2006.01)
*G06F 11/14* (2006.01)

(52) U.S. Cl.
CPC .... *G06F 17/30309* (2013.01); *G06F 11/1451* (2013.01); *G06F 17/30445* (2013.01)

(58) Field of Classification Search
None
See application file for complete search history.

(56) References Cited

U.S. PATENT DOCUMENTS

| | | | | |
|---|---|---|---|---|
| 6,625,593 | B1* | 9/2003 | Leung | G06F 17/30445 |
| 8,996,465 | B2* | 3/2015 | Mielenhausen | G06F 17/30362 707/611 |
| 9,177,035 | B2* | 11/2015 | Mielenhausen | G06F 17/30362 |
| 9,632,878 | B1* | 4/2017 | Maccanti | G06F 11/1469 |
| 9,633,051 | B1* | 4/2017 | Maccanti | G06F 11/14 |
| 9,720,992 | B2* | 8/2017 | Lee | G06F 17/30575 |
| 2014/0358855 | A1* | 12/2014 | Mielenhausen | G06F 17/30575 707/624 |

\* cited by examiner

*Primary Examiner* — Debbie M Le
(74) *Attorney, Agent, or Firm* — Davis Wright Tremaine LLP

(57) ABSTRACT

A hosted database service may receive a request to replicate data between two locations. Data may be replicated serially during an initial observation period. During the observation period, replication data may be analyzed to detect access patterns involving transaction delimiters and sequential or closely-timed access to data. Related tables may be assigned to replication groups. Replication data for the replication groups may be sent and processed in parallel. During parallel replication, effectiveness of the replication data may be monitored and the replication groups may be periodically readjusted.

20 Claims, 10 Drawing Sheets

DATABASE REPLICATION SCALING

BACKGROUND

Data may be replicated between the nodes of a distributed database management system. Typically, data replication involves the serial transmission of log entries describing changes made to a source node of the distributed database management system. The entries may be transmitted to a destination node, which can process the entries in the same order in which they were originally processed by the source. As a result, the destination database is able to maintain a copy of the data stored in the source database. The entries may be processed in parallel to increase replication performance. However, doing so may cause data corruption if the updates are processed in an incorrect order.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
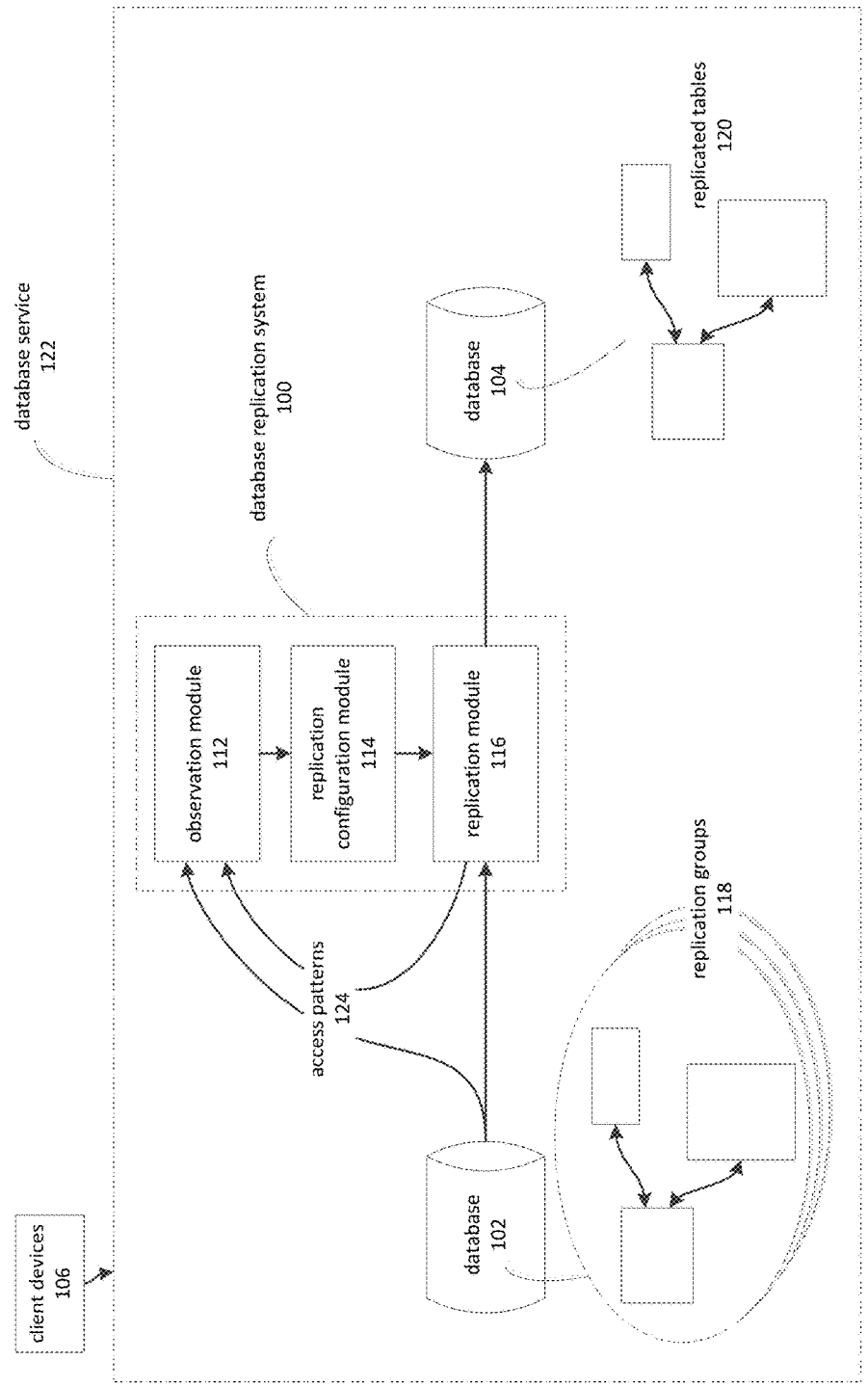
FIG. 1 is a block diagram depicting a database replication system.

Disclosed herein are systems, methods, and computer program products for replicating data between databases. Aspects of the present disclosure include techniques for parallelizing replication streams, based on data collected during an initial period of non-parallelized replication. In some instances, replication may be readjusted based on data collected after the initial period, including measurements of the effectiveness of the parallelized replication streams.

In an example, a provider may host a database on behalf of a client. The database might be hosted in a facility located at a particular geographic location. For various reasons, such as decreasing or eliminating downtime, the client may instruct the provider to replicate the database to another facility in a different geographic location.

To respond to the client's instructions, the provider may cause replication to be initiated between database management systems located at the two facilities. Initially, replication between the two database management systems may involve sending replication data, such as the contents of a database log file, to the destination database management system. The destination database management system may then process the replication data in the same order serially, i.e. in the same order in which it was originally processed by the source database management system.

Replicating a source database may involve the transmission of log file data collected during the operation of the source database. For example, the source database may process requests to store or otherwise access data. The requests may be recorded in a log file. The information stored in the log file may therefore be representative of the changes made to the source database itself. The contents of the source database may therefore be replicated by processing the same requests, based on the information in the log file, on a destination database.

A set of replication modules may monitor the replication data during this initial period. Based on the observations, the replication modules may identify tables in the source database that are likely to be related. Related tables may sometimes be described as being associated tables. Here, related tables may include those tables that are dependent upon each other in some way. For example, if an update to one table requires a second table to also be updated, the two tables may be related. Although table relationships may sometimes be explicitly defined, this is not always the case. Accordingly, during the initial period the replication modules may identify potentially related tables based on access patterns. The access patterns may involve transaction delimiters such as "begin transaction" and "commit" statements, sequential or closely-timed access to two or more tables, and so forth.

Tables that are believed to be related may be associated with a set of tables that may be referred to as a replication group. Replication data pertaining to a replication group may still be sent and processed serially. This may also be referred to as transmitting and processing the data in a non-parallelized manner. However, replication data pertaining to other replication groups—those groups not containing tables related to the first replication group—may be processed in parallel with the first replication group. The replication modules identify two or more sets of tables and associate the tables with replication groups. Once this is done, the replication modules may then cause replication data for the replication groups to be sent and processed in parallel. The replication module may, in some instances, cause replication data to be sent by issuing query language statements, data definition language statements, administrative commands, and so forth to the source and/or destination databases.

Replication data, as referred to herein, may include data extracted from the log file of the source database. In some cases, replication data may comprise a copy of a log file or a subset thereof. In general, replication data may include information indicative of operations performed to access the tables of the source database. The replication data may be processed by the destination database in order to produce a copy of the destination database.

A table, as used herein, may refer to a collection of data. In some cases, such as in relational databases, a table may refer to a collection of data organized according to a row and column format. Typically, in a relational database each table may have a fixed number of columns in each row. As used herein, a table may also include other types of data collections, such as those found in non-relational or "NoSQL" databases, which do not conform to a fixed structure. These types of databases may, for example, maintain tables that are collections of name-to-value(s) mappings.

FIG. 1 is a block diagram depicting a database replication system 100. A database 102 may comprise a number of collections of data, which may be referred to as tables. In some cases, a table may adhere to the row-and-column format typically found in relational database systems. In other cases, a table may have a less restrictive structure. A table may, for example, comprise collections of name-to-value mappings as is typically seen in "NoSQL" databases. A table may consist of rows, which may also be referred to as items. A row or item may contain columns, which may also be referred to as values.

The database service 122 may provide data storage and retrieval services on behalf of various client devices 106. These services may include storage and retrieval of data on the database 102. The database 102 may process requests to access the data maintained in the tables. As used herein, access to data in a table may refer to storing, retrieving, changing the data in the table. Accordingly, operations such as inserting, updating, deleting, and querying data in the table are access operations.

The tables in the database 102 may be associated by various relationships. In some cases, relationships between tables may be explicitly defined. For example, two tables may be linked by a primary key and foreign key relationship. These relationships may be reflected in the databases schema, and accordingly the relationships may be identified by examination of the schema. In other cases, however, relationships between tables may not be explicitly defined.

The database service 122 may receive an indication from one of the client devices 106 that it should initiate replication between two databases, such as a source database 102 and a destination database 104. The database replication system 100 may, in response to the request, replicate data between the tables in the source database 102 to the destination database 104. Data may be replicated between the tables of the two databases 102, 104 by sending the contents of a transactional log of the source database 102 to the destination database 104. At the destination database 104, the contents of the transactional log may be processed by performing the operations, as indicated by the transaction log, on the destination database 104. For example, the source database 102 might process a request to store a row $R_1$ and a request to update a row $R_2$. The transaction log might contain records of the two requests. Upon processing the record, the destination database 104 might then also store the row $R_1$ and update the row $R_2$.

The order in which items are processed by the destination database 104 may affect the consistency, integrity, and/or accuracy of the replicated data. For example, the source database 102 may process a number of requests to update the row $R_1$. The first request $Q_1$ might update a column of $R_1$ to be the value 'A,' while a second request $Q_2$ might update the same field to be the value 'B.' After both $Q_1$ and $Q_2$ are processed, the value of $R_1$ on the source database will be 'B.' If the destination database were to process $Q_1$ after $Q_2$, the value of the field on the destination database 104 would be 'A' instead of the correct 'B.'

There may, however, be cases in which the data may be processed in parallel. Requests that pertain to data in different tables are candidates for being processed in parallel. However, there may be interrelationships between data in different tables, and these interrelationships might cause data corruption were the replication data from the log file to be processed in parallel.

As described herein, the database replication system 100 may identify various subsets of the tables that have replication data that may be processed in parallel. A subset of tables that has been so identified may be described as a replication group, such as one of the replication groups 118 that are depicted in FIG. 1. The replication groups 118 selected from the tables of the source database 102 may be sent in parallel, with respect to each other, to the destination database 104 by the replication module 116. The database 104 may similarly process the received replication data, forming corresponding groups of replicated tables 120 in parallel.

The replication groups 118 may be formed by analysis of access patterns 124 of the database 102. The access patterns may, for example, be obtained from a transaction log of the database 102. The data might be obtained by observation of serially sent replication data sent between the source database 102 and the destination database 104, prior to parallelization.

The data analyzed with respect to access patterns 124 may involve various read and write operations performed by database 102 on behalf of client devices 106. For example, the client devices 106 may send requests to access tables in database 102. The client devices may, in some cases, send requests to access data maintained by a database service 122, which may forward the request to database 102.

The replication module 116 may initiate replication between the source database 102 and the destination database 104 prior to the formation of the replication groups 118. The replication module 116 may, during this stage, send replication data from the transaction log file of the database 102 to the destination database 104 in serial, i.e. not yet parallelized. In some cases, parallelization may be employed through manual specification of one or more replication groups 118. The parallelization may then be refined subsequently through the described techniques.

The observation module 112 may analyze the replication data sent during the initial phase and form the replication groups 118. Access patterns may be identified in the data. The access patterns may include repeated clusters of access to the tables of database 102. For example, a sequence of read requests might recur in the data, or a sequence of write operations. Tables accessed within the context of a transaction might be identified as one of replication groups 118. Various candidate replication groups 118 may be formed and evaluated until a statistical confidence level is reached, indicating that the selected replication groups 118 are appropriate candidates for parallelization.

The replication configuration module 114 may then modify the operation of the replication module 116 so that parallelism is used. Once this is done, each of the replication groups 118 may be sent to the destination database 104, where they may be processed independently to form replicated tables 120.

Figure 2:
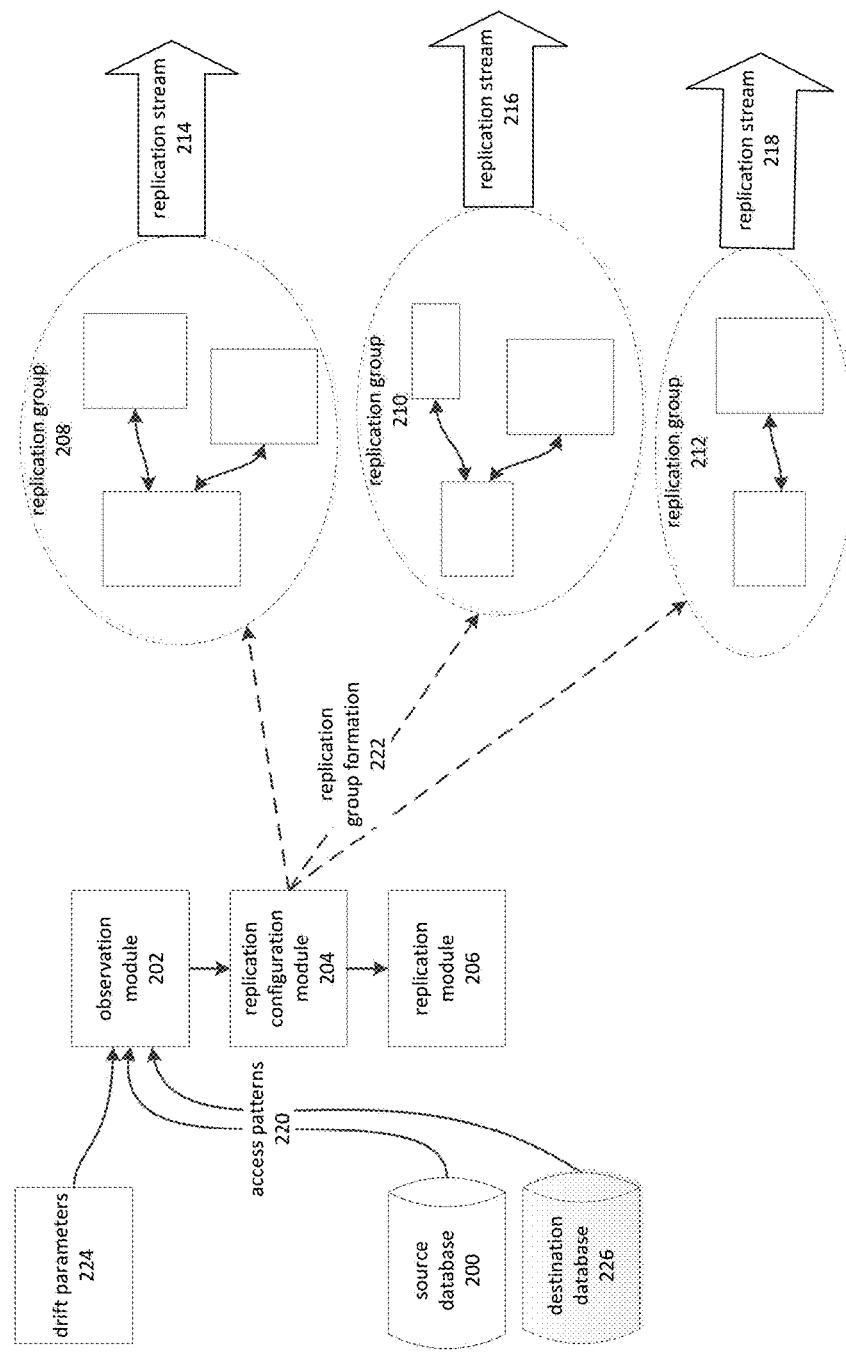
FIG. 2 is a block diagram depicting parallelized database replication.

Aspects of the present disclosure may be better understood in view of FIG. 2, which is a block diagram depicting parallelized database replication. A source database 200 may be in a replication relationship with a destination database 226. The replication module 206 may manage the replication of data between the source database 200 and the destination database. Replication between the source database 200 and the destination database may initially be performed in serial, or using a default set of replication groups that are processed in parallel with respect to other groups.

An observation module 202 may observe access patterns 220 for the source database 200 and the destination database 226. In other words, the observation module 202 may obtain and analyze data pertaining to how the tables in the source database 200 and the destination database 226 is being accessed. Of the access patterns 220, those related to the destination database 226 may be given priority in the determination.

Various parameters may guide the analysis of the access patterns 220 and the replication groups 208-212 formed based on the analysis. For example, the drift parameters 224 may be associated with a maximum amount of drift between replication groups that the system will permit. Drift refers to the degree to which the a stream of replication data for a replication group may diverge with respect to other streams. For example, consider two updates $U_1$ and $U_2$ that may have occurred in rapid succession, so that they may be considered to have occurred at the same time. Further consider that the two updates may have been applicable to unrelated tables and may have been assigned to separate replication groups. As such, the updates may be transmitted in replications streams that are to be processed in parallel with respect to each other. Drift may refer to the difference between the times at which the updates $U_1$ and $U_2$ are processed. The difference between times at which the updates $U_1$ and $U_2$ are processed may increase, for example, due to a difference in the number of updates within the replication group that $U_1$ is a member of compared to the number of updates in the replication group of $U_2$. In this case, if the replication group that $U_1$ is a member of has more updates than that of $U_2$, then update $U_1$ may be processed later than $U_2$, possibly by a wide margin.

Drift may be associated with a degree of risk. In particular, drift may be associated with a risk that the parallel processing of the replication streams may cause consistency issues. For example, it might be the case that a query is to be issued that depends upon the data affected by both $U_1$ and $U_2$.

The drift parameters 224 may provide information indicative of a maximum amount of drift. For example, drift parameters 224 may specify a maximum amount of time between two updates that may have occurred at approximately the same time, as described regarding updates $U_1$ and $U_2$. The drift parameters 224 may also be expressed in other terms, such as "high," "medium," and "low" levels of risk, or as a maximum number of replication groups.

In various instances, the observation module 202 may track drift occurring between the replication streams 214-218. If the amount of drift becomes excessive with respect to the drift parameters 224, the observation module 202 and the replication configuration module 204 may reduce the number of replication groups through a consolidation process. Alternatively, in some instances, replication groups that are ahead may be halted to allow lagging groups to catch up. Based on an observed amount of drift, the observation module 204 may determine a number of replication groups, and corresponding streams of replication data. For example, when drift is too high, the number of replication groups and corresponding streams may be reduced. When the drift is within a permissible amount, the number of replication groups and corresponding streams may be increased. The maximum number of replication groups and corresponding streams may also be based at least in part on the permissible level of drift. For example, observation of drift patterns may indicate association with a predicted amount of drift. The maximum number of replication groups and corresponding streams may therefore be determined based on the prediction.

The replication may evolve over time according to a replication group formation 222 process that may involve configuration managed by a replication configuration module 204. The configuration module 204 may identify and form various replication groups, such as the replication groups 208-212. The configuration module 204 may form the groups based on associations between tables that have been identified by the observation module 202.

The observation module 202 may employ various forms of analysis to group tables of the database 200 into sets that may then be placed into, or associated with, replication groups 208-212. Each replication group may contain or be associated with a subset of the tables of database 200. Each table may be a member of one of the replication groups 208-212. In some instances, each table may be a member of no more than one of the replication groups 208-212.

Data for each of the replication groups 208-212 may be obtained from the source database 200 and sent on a corresponding replication stream 214-218 to the destination database 226. For example, data pertaining to tables associated with the replication group 208 may be sent over replication stream 214 and data pertaining to tables associated with the replication group 212 may be sent over replication stream 218. The data corresponding to the replication streams 214-218 may be sent in parallel to each other over. Within a given replication group, the data is transmitted serially, for example in the temporal order of the events applicable to the tables within the given replication group. Regarding parallel transmission, the data may be sent over the same transmission media or over separate transmission media. The parallel transmission of the replication streams 214-218 may involve interleaving data packets on the transmission media. The replication streams 214-218 may be received in parallel by the destination database 226 and processed in parallel. In some cases, the destination database may comprise multiple computing nodes to facilitate parallel processing of the replication groups 208-212.

Figure 3:
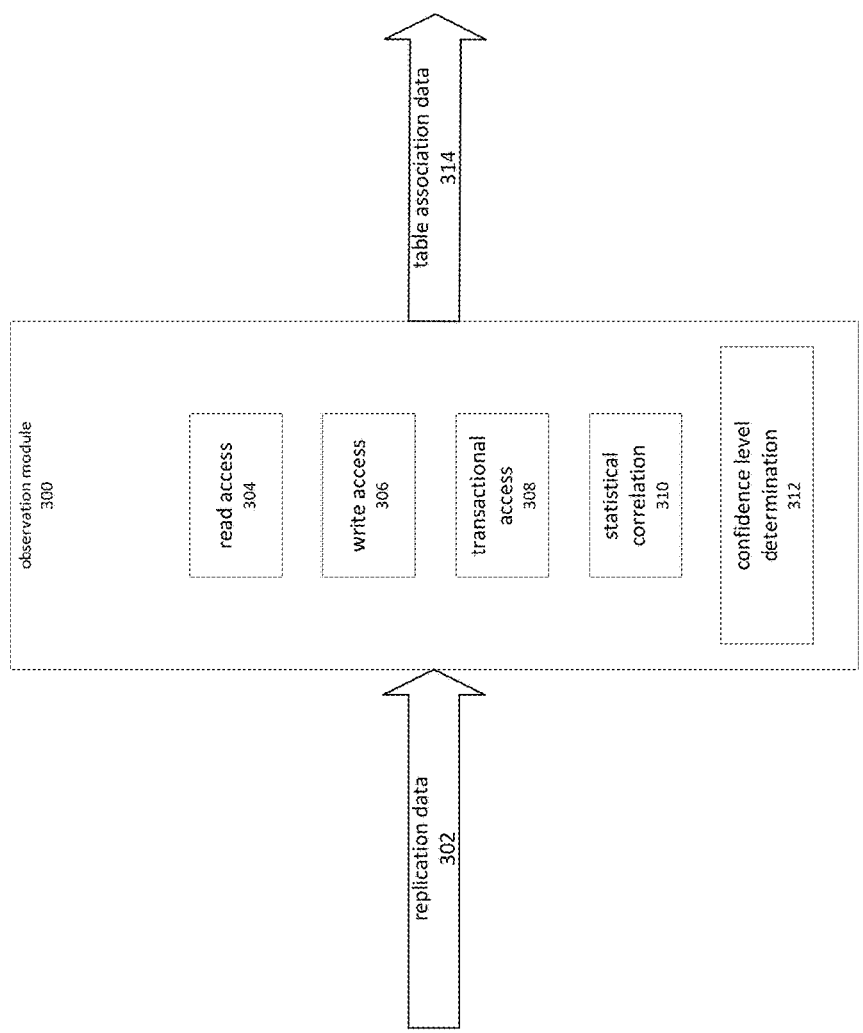
FIG. 3 is a block diagram depicting analysis of a stream of replication data.

FIG. 3 is a block diagram depicting analysis of a stream of replication data. An observation module 302 may access data obtained from a stream of replication data 302 and, based on analysis of the data, produce replication table association data 314. The table association data 314 may include data that may be used to define sets of tables that may, within some level of confidence, be replicated in parallel streams. The observation module 300 may comprise a portion of a memory and instructions, loaded in whole or in part into the portion of the memory, for executing instructions consistent with the description provided herein.

The observation module 300 may analyze the replication data 302 by looking for possible associations between tables. Possible associations may be identified based on a number of factors, including but not limited to temporal and transactional patterns of access. The patterns may be observed in the stream of replication data 302. Tables that are identified as being potentially associated may form a replication group.

A temporal relationship may include access to a table $T_1$ followed by access to a table $T_2$ within some period of time. The period of time between the access to $T_1$ and $T_2$ may also be indicative of the relationship. If the access is sequential, meaning that no other requests to access data intervene between the requests to access $T_1$ and $T_2$, then the association between $T_1$ and $T_2$ may be more strongly suggested than if a number of requests are intervening. The amount of time that elapses between access to $T_1$ and $T_2$ may also be indicative of the strength of the possible association.

The observation module 300 may identify transactional access patterns based on replication data that is indicative of the start and end of a transaction. A transaction involves a set of operations on a database that are performed atomically, meaning that either all of the operations are successfully performed or none are performed. Typically, a transaction may begin with a command such as "begin transaction" statement, and end with a "commit" or "rollback" statement. The observation module may observe these statements in the replication data 302. Data that is accessed during the transaction, i.e. between a "begin transaction" statement and either a "commit" or "rollback" statement, may be deemed to be associated. In some instances, associations based on transaction factors may be weighted more heavily than other types of associations.

In FIG. 3, the observation module 300 is depicted as having various sub-components for performing analysis of the replication data 302. These sub-components include read access 304, write access 306, transaction 308, and statistical correlation 310. The sub-components may comprise instructions for maintaining statistical records pertaining to replication data 302, instructions for calculating a likelihood that two tables are associated, and so on.

The read access 304 sub-component may monitor indications in the replication data 302 of requests to read data that were processed by the source database. The monitoring may include tracking read access to two or more tables that occurs sequentially, or within a threshold period of time. For example, a pattern of access comprising reading from $T_1$ followed immediately, or within a short time period, by reading from table $T_2$ may indicate that $T_1$ and $T_2$ are related in some way, and should be included in the same replication group.

The write access 306 sub-component may monitor indications in the replication data 302 of requests to write data that were processed by the source database. Similarly to monitoring read operations, the monitoring of write operations may include tracking write access to two or more tables occurring sequentially or within a threshold amount of time.

The read access 304 and write access 306 sub-components may also track correlations between read and write operations. For example, there might be an access pattern indicated by the replication data 302 in which table $T_1$ is first read from and then $T_2$ is written to. This pattern may, in some cases, be considered to be indicative of an association between T1 and T2 that suggests including them in the same replication group.

The transaction access 308 sub-component may monitor operations performed in the context of transactions. As noted previously, the tables on which operations are performed within the context of single transaction may be deemed associated to each other, and may then be included in the same replication group based on being associated.

The statistical correlation 310 sub-component may perform statistical calculations on the data collected by the read access 304, write access 306, and transactional access 308 sub-components. The calculations may include determining the relative frequency of certain access patterns. For example, the statistical correlation 310 sub-component may determine that the access pattern $T_1T_2$ occurs with a frequency of $F_1$, and that the access pattern $T_1$ $T_3$ occurs with a frequency of $F_2$. If the frequencies $F_1$ and $F_2$ are above a threshold level, the statistical correlation 310 sub-component may then determine that the tables $T_1$, $T_2$, and $T_3$ should be included in the same replication group.

A confidence level determination 312 sub-component may determine whether the identified associations between tables are, from a statistical viewpoint, sound enough to warrant including or excluding a table from a replication group. The confidence level determination 312 sub-component may also determine whether enough data has been evaluated to warrant the proposed replication groups.

In some cases, the observation module 300 may gather data for a period of time that is sufficient to reach a desired confidence level. In some cases, the confidence level may determine the manner in which table associations are used. In particular, the confidence level may influence the degree of parallelization that may be attempted. For example, when the confidence level is high, a large number of replication groups may defined, each of which may contain a relatively small number of tables. If the confidence level is lower, fewer replication groups may be defined, each having a greater number of tables. The degree of parallelization is less in this case, since there are fewer replication groups to process in parallel. However, with fewer replication groups there is less chance of replication data being processed in an incorrect order.

The table association data 314, including confidence level data, may be used by a configuration module to form replication groups that may be sent and processed in parallel. The replication groups may also be modified over time, as more data enables a higher confidence level or as the associations between tables changes.

In some instances, data sources other than, or in addition to, a stream of replication data may be monitored and analyzed in the manner depicted by FIG. 3. For example, a stream of information indicative of access to database tables may be received and processed by the observation module 300. The stream may correspond to one or more sources of the information. The stream may, for example, comprise information indicative of access to the tables in a destination database that have been replicated from a source database. In some instances, the stream may comprise information indicative of access to the source database, or to both the source database and the destination database.

Figure 4:
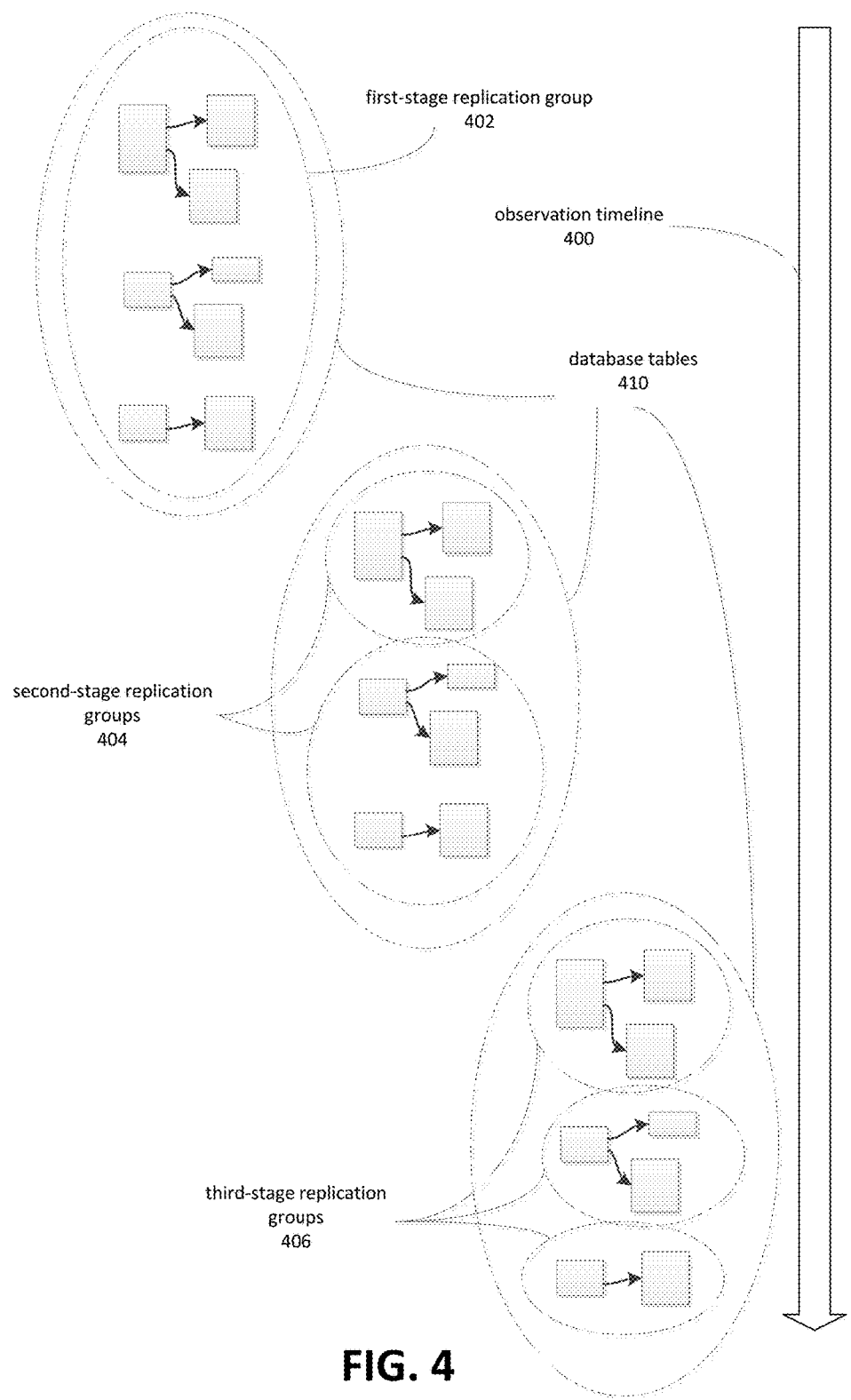
FIG. 4 is a block diagram depicting evolution of replication groups over time.

FIG. 4 is a block diagram depicting evolution of replication groups over time. The observation timeline 400 refers to the collection of data over time, so that less data is available towards the tail end of the arrow and more data is available at the head. Referring back to FIG. 1, as replication data from the database 102 is processed, the observation module 112 may begin to collect replication data when a replication service is initiated. Over time, it may provide definitions of sets of tables that are believed to be related, with an increasing level of confidence. Based on the definitions and the confidence level, the replication configuration module 114 may cause the replication process to parallelize replication using the identified replication groups.

As depicted by FIG. 4, there may initially be a first-stage replication group 402 comprising all of the database tables 410. In some instances, this may be a default configuration for the replication process, adopted in response to an initial request to initiate replication between a source database and a destination database. The default configuration may also be adopted when there is a lack of a sufficient amount of replication data, such that the confidence in any possible groupings would be low.

At a later time, the observation module 112 may have accumulated sufficient data to form a set of second-stage replication groups 404. Here, there may be sufficient data to assign the database tables 410 to two replication groups with a tolerable confidence level, but perhaps not yet enough data to reliably assign database tables 410 to more than two replication groups. At a later time, there may be enough data to form the third-stage replication groups 406.

Note that FIG. 4 depicts a process of forming additional replication groups to enable increased parallelization of replication. The additional replication groups may typically be formed based on the availability of additional replication data, which in turns enables more accurate statistical analysis of the data. There are, however, other factors which may also influence the degree of parallelism that may be employed. One factor may be tolerance for the risks associated with inaccurate replication groups. These risks may include inconsistent replication speeds, due to additional processing that may be done to ensure data consistency when there are dependencies between tables that are not reflected in the assigned replication groups. Another factor that may influence the degree of parallelism is non-replication data that may be indicative of relationships between tables. This type of data can include user-provided definitions of replication groups or table relationships, database schema information such as primary key and foreign key relationships, and data definition language ("DDL") statements that might be used to create new sets of tables. These various types of data may be indicative—perhaps strongly so—of relationships between tables and may, in some instances, be applied prior to accumulating enough data to produce replication groups with a high degree of confidence.

Also note that although FIG. 4 depicts forming additional replication groups over time, there may be some instances in which the number of replication groups, and thus the degree of parallelism, decreases over time. This may, for example, occur when a replication group is proved over time to be subject to an excessive number of outlier cases. An outlier case may be described as a case in which there is a dependency between tables in two or more existing replication groups. Outlier cases may be handled through various means, such as pausing and synchronizing the involved replication groups. However, if the number of outlier cases becomes excessive then the replication observation module 112 and replication configuration module 114 may restructure the existing replication groups.

Figure 5:
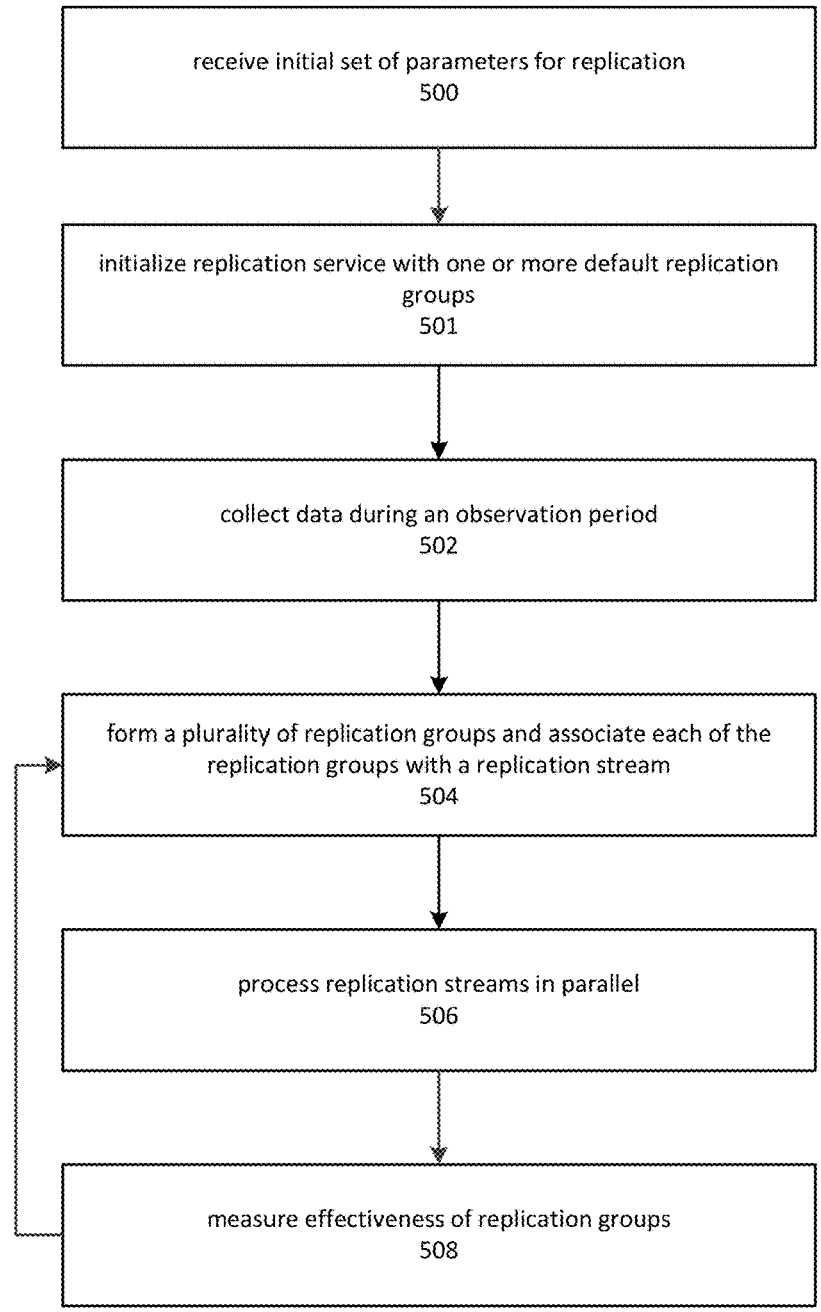
FIG. 5 is a flow diagram depicting parallelizing replication between a source database and a destination database.

Aspects of the present disclosure may be better understood in view of FIG. 5, which is a flow diagram depicting parallelizing replication between a source database and a destination database. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 500 depicts receiving an initial set of parameters for a requested replication process. The parameters may be obtained from various sources, including but not limited to a request for a database service to implement replication between two databases. The initial set of parameters may include indications of a permissible level of drift between replication groups. The permissible level of drift may be specified in a variety of ways, such as an amount of time, a percentage, a risk level, and so forth. Other parameters may also be supplied, such as those indicating a maximum number of replication groups, a desired maximum latency, and so forth. Some or all of these factors may also be specified as a risk level or other similar indicator.

Block 501 depicts initializing a replication service with a default replication group. The replication service may be provided in association with a database service. For example, a provider may host a database on behalf of a customer. The provider may host the database in a first geographic region. The customer, wishing to provide improved availability of the data, might wish for the provider to replicate data from the database in the first geographic location to a database in a second geographic location. The customer might send a request to the provider to initiate the replication.

The provider may then initiate the service using one or more default replication groups. In some cases, the default may be a single replication group comprising all of the tables that are to be replicated. In other cases, information such as the schema of the database or customer-provided information may be used to establish an initial set of replication groups.

Block 502 depicts collecting data during an observation period. The observation period may be based on various factors, such as customer-provided input or a confidence level goal. In the latter case, the confidence level goal may be derived based on other factors such as how outliers are handled and a replication latency goal.

During the observation period, an observation module such as the observation module 300 depicted in FIG. 3, may gather information related to access patterns for the tables that are to be replicated. As described herein, for example in relation to FIG. 3, the observation may involve collecting statistics related to correlated read operations, write operations, and transaction delimiters. The observation period may be fixed, or may be adjusted based on a confidence level calculation. The information gathered during the observation period may be used to determine, using the various techniques such as those described in relation to FIG. 3, that tables may be related and a confidence level indicating a confidence level regarding the identified relationships.

Block 504 depicts forming a plurality of replication groups and associating each of the replication groups with a replication stream. The replication groups may be formed by assigning related groups of tables, as estimated during the observation period, to sets of tables. The sets of tables may be non-overlapping, so that each table is a member of exactly one replication group, or none if the table is not to be replicated.

Each replication stream may send replication data for its corresponding replication group. Each stream may be sent independently of the other streams. The replication data may be sent to a destination database. In some instances, the destination database may comprise multiple computing nodes. In such cases, the streams may be sent to the appropriate computing node for processing. For example, a first replication group might contain a first table corresponding to a first horizontal partition of a dataset. A second replication group might contain a second table corresponding to the second horizontal partition of the dataset. The first replication group might be associated with a replication stream that is sent to the computing node that is maintaining the first table, while replication data for the second replication stream may be sent to a computing node that is maintaining the second table.

Block 506 depicts processing the replication streams in parallel. The destination database may receive and process the replication streams in parallel. For example, assume that a database receives data from a first replication stream comprising updates $U_{x1}$, $U_{x2}$, and $U_{x3}$, in that order. Further assume that the database receives data from a second replication stream comprising updates $U_{y1}$, $U_{y2}$, and $U_{y3}$. In this case, the database would process the updates $U_{x1}$, $U_{x2}$, and $U_{x3}$ in order with respect to each other. The database would also process the updates $U_{y1}$, $U_{y2}$, and $U_{y3}$ in order, but the order of $U_{y1}$ with respect to any of $U_{x1}$, $U_{x2}$, and $U_{x3}$ would not matter, since the two streams may be processed in parallel. The same is true of updates $U_{y2}$, and $U_{y3}$. For example, update $U_{y2}$ could be processed before or after $U_{x1}$, $U_{x2}$, or $U_{x3}$, but not before $U_{y1}$ or after $U_{y3}$.

Block 508 depicts measuring the effectiveness of the replication groups. The effectiveness of the replication groups may be measured with respect to various factors. One such factor involves replication latency—a measure of how long it takes a change made to the source database to be applied to the destination database. A current measure of replication latency may be compared to a target amount. If the current amount is greater than, i.e. is worse than, the target amount of replication latency, then additional replication groups may be called for, if there are tables that may be split from an existing replication group.

Another factor that relates to the effectiveness of the replication groups is the number of outliers that are encountered in a replication stream. For example, assume that a first replication group has been established to contain table $T_1$, and a second replication group has been established to contain table $T_2$. At some later point, a transaction might be identified in the replication stream in which both $T_1$ and $T_2$ are updated in the context of the same transaction. Since this may imply a relationship between $T_1$ and $T_2$ that requires updates to the two tables to be synchronized, the updates to $T_1$ and $T_2$ may be considered to be outliers, and may require special handling to ensure that the updates to $T_1$ and $T_2$ are processed in the proper order. The effectiveness of the replication groups may be reduced by the special handling.

As depicted in FIG. 5, the operations of blocks 504 to 508 may be repeated. In some instances, the operations of blocks 504 to 508 may be repeated when the effectiveness of the replication groups, as measured by the operations of block 508, falls below some threshold level. Note that in some cases, the effectiveness of an existing set of replication groups may change over time, as new tables and new data is added to the source and destination databases, and as the databases are used in new ways.

Figure 6:
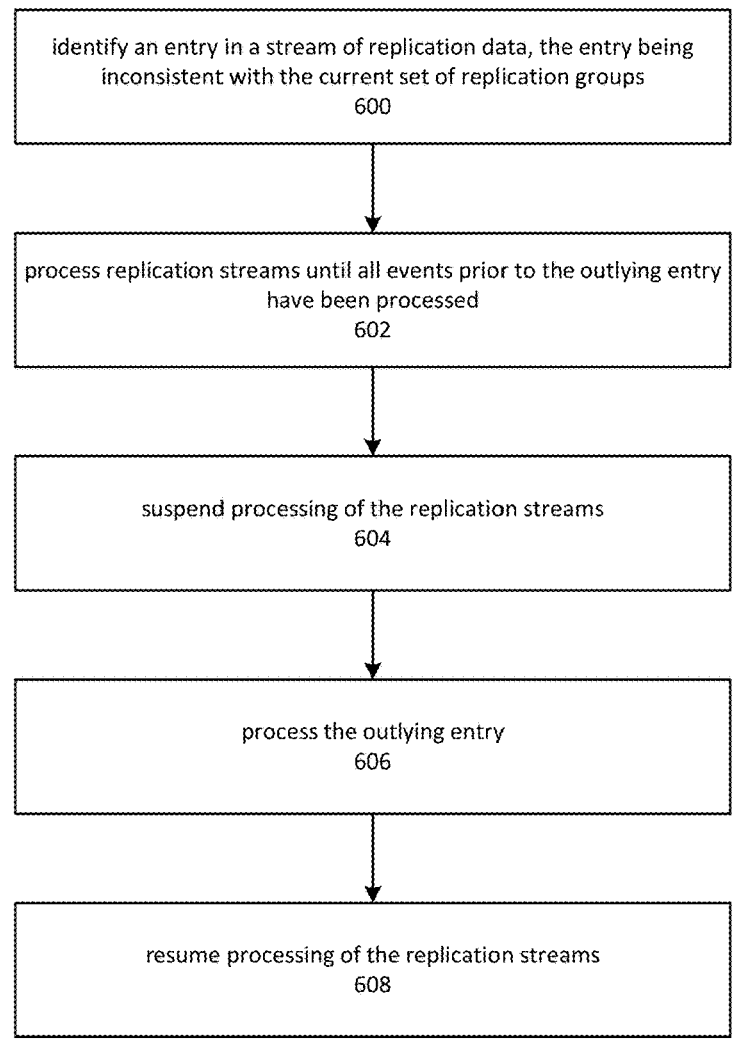
FIG. 6 is a flow diagram depicting outlier handling.

FIG. 6 is a flow diagram depicting outlier handling. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts identifying an outlying event in a stream of replication data. The outlying event may involve access to data in a manner that is inconsistent with the current set of replication groups. Here, inconsistent may refer to the access being dependent on tables associated with different replication groups. For example, a query may contain references to tables that reside in different replication groups, or references to tables in different replication groups may be indicated within a specific transaction. When an outlier is identified, embodiments may, as depicted by FIG. 6, suspend replication of one or more replication groups in order to apply an outlying operation in the correct order.

As depicted by block 602, when the outlying event is detected, the various replication streams may be processed in parallel until all of the events prior to the outlying event have been processed. For example, if an outlying event has been detected and corresponds to a time or sequence number $T_1$, then the entries in two streams of replication data may be processed until the next entry to be processed corresponds to a time equal to or greater than time $T_1$. Note that the database should complete processing of entries prior to the outlier before processing the outlier entry. It may be insufficient to only send the entries prior to the outlier.

As depicted by block 604, the replication streams may be paused once time $T_1$ has been reached, where $T_1$ corresponds to a time associated with the outlying entry. In some instances, only the replication groups related to the outlier are paused. For example, if $T_1$ and $T_2$ are in different replication groups, but $T_1$ is dependent on an update to $T_2$, then the two replication groups, containing $T_1$ and $T_2$, respectively, may be paused while all other replication groups are allowed to continue. These two groups would be paused at a point just prior, in time or sequence, to the outlying entry.

Block 606 depicts processing the outlying entry once the previous entries have been processed by the database. After processing the outlying entry, the paused replication streams may be resumed and parallel processing can continue. This operation is depicted by block 608.

Figure 7:
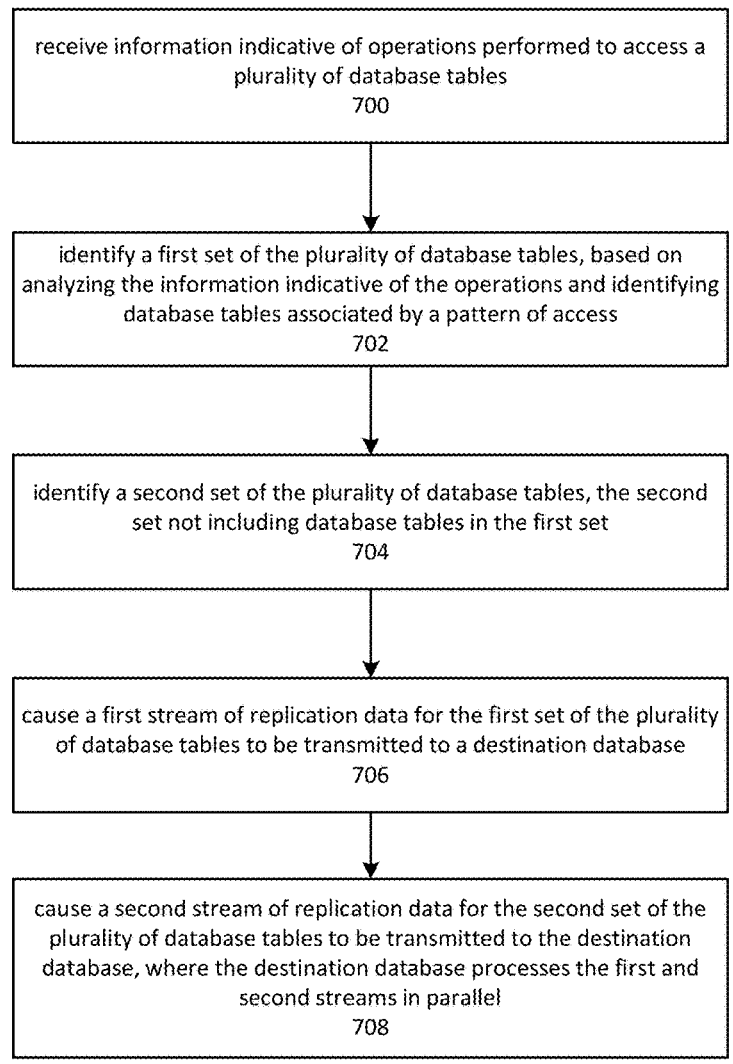
FIG. 7 is a flow diagram depicting parallelized replication between a source and destination database.

Aspects of the present disclosure may be understood in view of FIG. 7, which is a flow diagram depicting parallelized replication between a source and destination database. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts receiving information indicative of operations performed to access a plurality of database tables. The operations may be processed by a source database, and may involve access operations such as inserting, updating, deleting, and retrieving data. Typically, information describing the operations is written to a transaction log. An observation module, such as the observation module 112 depicted in FIG. 1, may receive the data and analyze it using the various techniques presented herein.

As depicted by block 702, the observation module 112 may identify a first set of the plurality of database tables, based on analyzing the information indicative of the operations and identifying database tables associated by a pattern of access. The patterns of access may, as described herein, include tables referenced within a transaction, tables referenced in sequence or within a threshold period of time, or tables having some sort of statistical correlation in the stream of replication data.

Block 704 depicts identifying a second set of the plurality of database tables, where tables in the second set are not included in the first set. In other words, the sets of database tables identified by the observation module 112 are non-overlapping. A given table is therefore assigned to one, and only one, replication group.

Block 706 depicts causing a first stream of replication data to be sent to a destination database. The first stream may correspond to operations performed on the first set of the plurality of database tables. Similarly, block 708 depicts causing a second stream of replication data to be sent to the destination database, where the second stream corresponds to the second set of the plurality of database tables. The first and second streams of replication data may be received by the destination database and processed in parallel.

Figure 8:
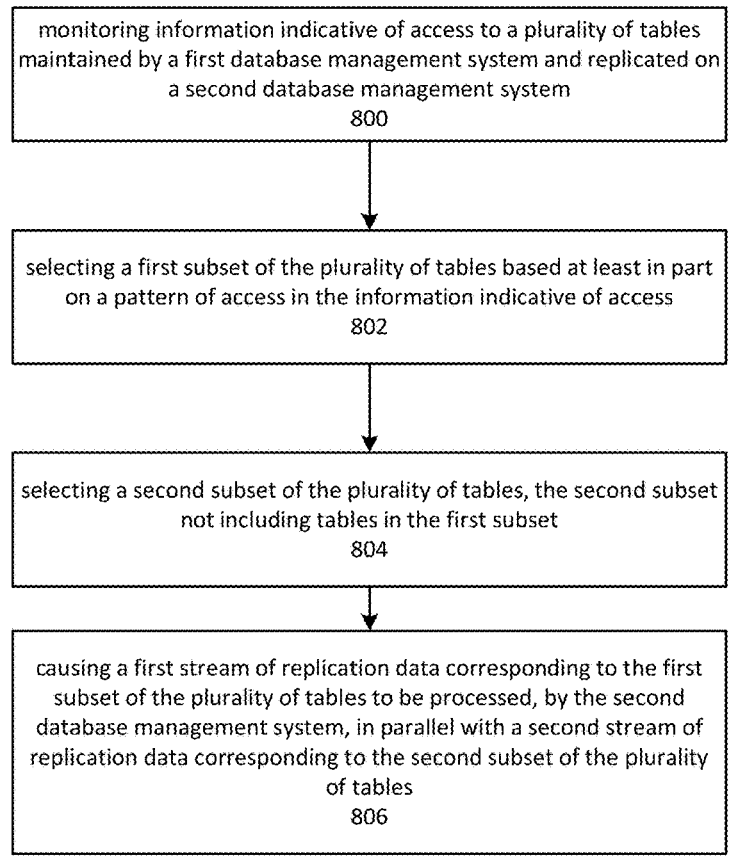
FIG. 8 is a flow diagram depicting parallelization of a replication between a source and destination database.

Aspects of the present disclosure may be understood in view of FIG. 8, which is a flow diagram depicting parallelization of a replication between a source and destination database. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 depicts monitoring information indicative of access to a plurality of tables maintained by the first database management system. This may comprise entries from a log file. In some instances, the monitored information may be a replication stream. During an initial observation period, one or more default replication groups may be created. In some instances, the contents of the replication streams for the one or more default replication groups are monitored.

Block 802 depicts selecting a first subset of the plurality of tables based at least in part on a pattern of access in the information indicative of access to the tables in the first database. As depicted by block 804, embodiments may also select a second subset of the plurality of tables, so that the second subset does not include tables that are in the first subset. Tables may be assigned to subsets of the plurality of tables based on a degree to which tables in a subset of the plurality of tables are perceived to be related. Tables perceived to be unrelated may be placed in separate replication groups, while tables perceived to be related may be included. A threshold degree of perceived relatedness may be defined, so that tables whose perceived relatedness is above a threshold level are included in the same subset, while those tables whose perceived relatedness is below the threshold level are excluded. The assigning of tables to subsets may be performed as a minimization/maximization problem with respect to a measure of relatedness that is derivable from the observed data.

Block 806 depicts causing a first stream of replication data corresponding to the first subset of the plurality of tables to be processed, by the second database management system, in parallel with a second stream of replication data corresponding to the second subset of the plurality of tables. This may involve parallel transmission of the replication streams to one or more nodes of the destination database.

Figure 9:
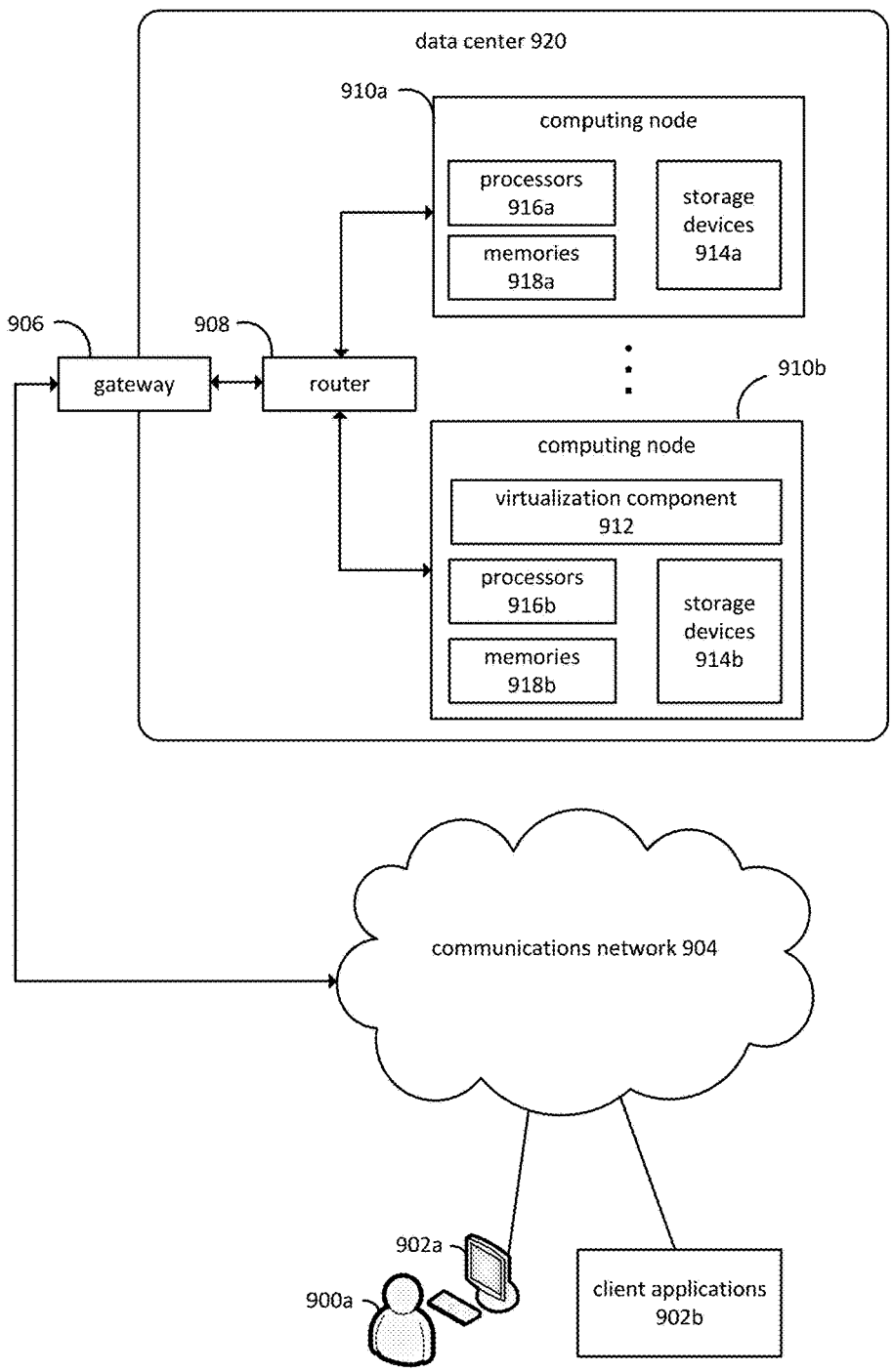
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a and 910b within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a and 910b may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910a and 910b. Some of these intermediate layers may themselves comprise processes executing on one or more of the computing nodes. Computing nodes 910a and 910b, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910a is depicted as residing on physical hardware comprising one or more processors 916a, one or more memories 918a, and one or more storage devices 914a. Processes on computing node 910a may execute in conjunction with an operating system or alternatively may execute as a bare-metal process that directly interacts with physical resources, such as processors 916a, memories 918a, or storage devices 914a.

Computing node 910b may comprise a virtualization component 912, which may include a virtual machine host and virtual machine instances to provide shared access to various physical resources, such as physical processors, memory, and storage devices. These resources may include the depicted processors 916b, memories 918b, and storage devices 914b. Any number of virtualization mechanisms might be employed to provide shared access to the physical resources.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented without the use of virtualization, computing nodes may include one or more memories configured to store computer-readable instructions and one or more processors configured to read and execute the instructions. A computing node may also comprise one or more storage devices, network interfaces, communications buses, user interface devices, and so forth. Computing nodes may also utilize virtualized computing resources, such as virtual machines implemented with or without a hypervisor, virtualized bare-metal environments, and so forth. A virtualization-based computing node therefore encompasses both the virtualization resources and the physical hardware needed to execute the virtualization resources. A computing node may be configured to execute an operating system and application programs. In some embodiments, a computing node might also comprise bare-metal application programs.

Figure 10:
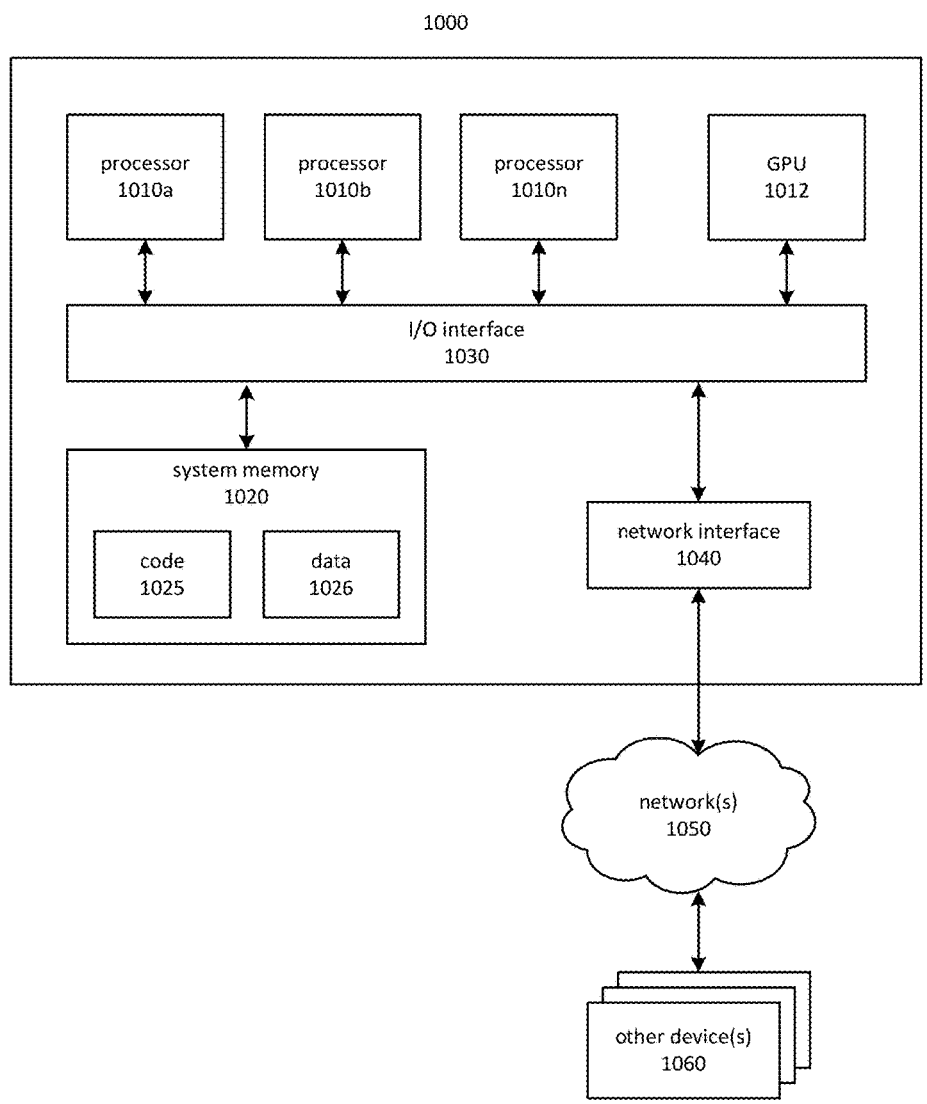
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010a, 1010b, and/or 1010n (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device. In some instances, the GPU 1012 may perform calculations and execute instructions in cooperation with or in place of the processor 1010. Accordingly, as used herein, the term processor may encompass a GPU. Similarly, other highly parallelized processor architectures that supplement or replace the operation of the primary processor 1010 are also encompassed by the term processor.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The computing device 1000 may be configured by software instructions to contain a module (not shown). A module is a component of the computing device 1000 that includes a portion of a system memory 1020 and a set of instructions, loaded in whole or in part into the portion of the system memory 1020, for performing a set of related functions, including receiving input from other modules and transmitting or sending output to other modules. The code 1025 and data 1026 of the system memory 1020 are altered by the loading of the instructions for the module. Receiving and transmitting data may include transference of data to a portion of memory reserved for interchange, such as a stack or a global memory. The operation of a module may be effected by interchange between processor 1010, or in a multiprocessor system 1010*a*-1010*n* and/or GPU 1012, and the system memory 1020 via I/O interface 1030. A module may interact with other modules of the computing device 1000 via system memory 1020, and with other devices 1060 via network interface 1040 and network 1050.

A compute node, which may be referred to also as a computing node, may be implemented on a wide variety of computing environments, such as tablet computers, personal computers, smartphones, game consoles, commodity-hardware computers, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, instructions executed by one or more computers or computer processors. The instructions may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software instructions and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the instructions, systems, and data structures may also be stored (e.g., as software instructions or structured data) on a computer-readable medium, such as a hard disk, a memory, a network, or a portable media article to be read by an appropriate device or via an appropriate connection. The instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for synchronizing data comprising:
   a first one or more computing nodes maintaining a first database comprising a plurality of database tables;
   a second one or more computing nodes maintaining a second database comprising replicated versions of the plurality of database tables; and
   a third one or more computing nodes that at least:
   receive information indicative of operations performed to access data stored in the plurality of database tables and the replicated versions of the plurality of database tables;
   identify a first set of the plurality of database tables by at least analyzing the information indicative of the operations and identifying database tables of the plurality of database tables that are associated by a pattern of access;
   identify a second set of the plurality of database tables, the second set not including database tables in the first set;
   cause a first stream of replication data for the first set of the plurality of database tables to be sent to the second database; and
   cause a second stream of replication data for the second set of the plurality of database tables to be sent to the second database, wherein the first stream of replication data is processed by the second database in parallel with the second stream of replication data.

2. The system of claim 1, wherein the third one or more computing nodes at least:
   receive a request to initiate replication between the first database and the second database; and
   cause a serial stream of replication data to be sent to the second database prior to receiving the information indicative the operations and identifying the first and second sets of the plurality of database tables.

3. The system of claim 2, wherein the information indicative of the operations is received from the serial stream of replication data.

4. The system of claim 1, wherein the third one or more computing nodes at least:
   determine that a first database table and a second database table are associated based at least in part on the information indicative of the operations being indicative of access to the first and second database tables occurring within a transaction.

5. The system of claim 1, wherein the third one or more computing nodes at least:
   determine that a first database table and a second database table are associated based at least in part on the information indicative of the operations being indicative of a query comprising access to the first and second database tables.

6. A method for replicating data between a first database management system and a second database management system, the method comprising:
   monitoring information indicative of operations performed to access to a plurality of tables maintained by the first database management system and the second database management system;
   selecting a first subset of the plurality of tables based at least in part on a pattern of access in the information indicative of the operations performed to access the plurality of tables;
   selecting a second subset of the plurality of tables, the second subset not including tables in the first subset; and
   causing a first stream of replication data corresponding to the first subset of the plurality of tables to be processed, by the second database management system, in parallel with a second stream of replication data corresponding to the second subset of the plurality of tables.

7. The method of claim 6, further comprising:
initiating replication between the first and second database management systems by causing an initial stream of replication data to be sent to the second database prior to receiving the information indicative of the operations.

8. The method of claim 7, wherein the monitoring comprises examining the initial stream of replication data.

9. The method of claim 7, further comprising:
monitoring the information indicative of the operations until a confidence value associated with the first subset of the plurality of tables exceeds a threshold value.

10. The method of claim 6, further comprising:
determining that a first database table and a second database table are associated based at least in part on the information indicative of the operations being indicative of access to the first and second database tables occurring within a transaction.

11. The method of claim 6, further comprising:
determining that a first database table and a second database table are associated based at least in part on the information indicative of the operations being indicative of a query comprising access to the first and second database tables.

12. The method of claim 6, further comprising:
determining the first stream of replication data comprises access to a table of the second subset of the plurality of tables, the access associated with a first point in time; and
causing processing of the first stream of replication to be suspended until processing of the second stream is synchronized with the first point in time.

13. The method of claim 6, further comprising:
determining a number of streams of replication data based at least in part on information indicative of a permissible amount of drift between the streams of replication data.

14. The method of claim 6, further comprising:
receiving information indicative of a monitoring period; and
selecting the first subset of the plurality of tables and the second subset of the plurality of tables based at least in part on a subset of the information indicative of operations, the subset collected during the monitoring period.

15. The method of claim 6, further comprising:
reducing a number of streams of replication data based at least in part on information indicative of an amount of drift between one or more streams of replication data.

16. A non-transitory computer-readable storage medium having stored thereon instructions that, upon execution by one or more computing devices, cause the one or more computing devices to at least:
receive a first stream of information indicative of access to a plurality of tables maintained by one or more database management systems;
identify a pattern of access in the first stream of information;
select a first subset of the plurality of tables based on the pattern of access;
select a second subset of the plurality of tables, the second subset not including tables in the first subset;
send a first stream of replication data corresponding to the first subset of the plurality of tables; and
send a second stream of replication data corresponding to the second subset of the plurality of tables, the second stream sent in parallel with the first stream.

17. The non-transitory computer-readable storage medium of claim 16 comprising further instructions that, upon execution by the one or more computing devices, cause the one or more computing devices to at least:
monitor the first stream of information until a confidence value for the first subset of the plurality of tables exceeds a threshold value.

18. The non-transitory computer-readable storage medium of claim 16, comprising further instructions that, upon execution by the one or more computing devices, cause the one or more computing devices to at least:
select a third subset of the plurality of tables based on monitoring the first and second streams of replication data; and
send a third stream of replication data corresponding to the third subset of the plurality of tables in parallel with sending the first and second streams of replication data.

19. The non-transitory computer-readable storage medium of claim 16, comprising further instructions that, upon execution by the one or more computing devices, cause the one or more computing devices to at least:
select the first subset of the plurality of tables and the second subset of the plurality of tables based at least in part on a monitoring period and information indicative of a maximum number of streams of replication data.

20. The non-transitory computer-readable storage medium of claim 16, wherein the information indicative of access to a plurality of tables corresponds to access to a plurality of tables replicated from a source database.

* * * * *